United States Patent
Kim et al.

(10) Patent No.: US 11,184,800 B2
(45) Date of Patent: Nov. 23, 2021

(54) STEERING RULE PROVISION METHOD FOR TRAFFIC DISTRIBUTION IN NETWORK AND NETWORK ENTITY PERFORMING THE SAME

(71) Applicant: ELECTRONICS AND TELECOMMUNICATIONS RESEARCH INSTITUTE, Daejeon (KR)

(72) Inventors: Changki Kim, Daejeon (KR); Yoo Hwa Kang, Daejeon (KR); Jeoung Lak Ha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 3 days.

(21) Appl. No.: 16/742,010

(22) Filed: Jan. 14, 2020

(65) Prior Publication Data

US 2020/0229035 A1    Jul. 16, 2020

(30) Foreign Application Priority Data

Jan. 15, 2019 (KR) .................. 10-2019-0005385
Feb. 18, 2019 (KR) .................. 10-2019-0018367
Dec. 31, 2019 (KR) .................. 10-2019-0179568

(51) Int. Cl.
| | | |
|---|---|---|
| *G01R 31/08* | (2020.01) | |
| *H04W 28/06* | (2009.01) | |
| *H04W 80/10* | (2009.01) | |
| *H04W 8/08* | (2009.01) | |
| *H04L 12/851* | (2013.01) | |

(Continued)

(52) U.S. Cl.
CPC ........... *H04W 28/065* (2013.01); *H04L 45/24* (2013.01); *H04L 47/2483* (2013.01); *H04W 8/08* (2013.01); *H04W 36/0011* (2013.01); *H04W 36/14* (2013.01); *H04W 76/11* (2018.02); *H04W 80/10* (2013.01)

(58) Field of Classification Search
None
See application file for complete search history.

(56) References Cited

U.S. PATENT DOCUMENTS 9,467,921 B2    10/2016  Sirotkin et al.
11,096,106 B2 *  8/2021  Salkintzis ............... H04L 47/10
(Continued)

OTHER PUBLICATIONS

"3rd Generation Partnership Project; Technical Specification Group Services and System Aspects; System Architecture for the 5G System; Stage 2 (Release 15)", 3GPP TS 23.501 V15.4.0 (Dec. 2018).

(Continued)

*Primary Examiner* — Gerald A Smarth
(74) *Attorney, Agent, or Firm* — LRK Patent Law Firm (57) ABSTRACT

A steering rule provision method for traffic distribution in a network and a network entity performing the same network. A session management function (SMF) may transmit a first message including a multi-access rule (MAR) to a user plane function (UPF), when establishing or modifying a packet data unit (PDU) session for ATSSS (Access Traffic Steering, Switching, and Splitting). The SMF may receive a second message that is a response message to the first message from the UPF.

15 Claims, 5 Drawing Sheets

(51) Int. Cl.
  *H04W 36/00* (2009.01)
  *H04W 36/14* (2009.01)
  *H04L 12/707* (2013.01)
  *H04W 76/11* (2018.01)

(56) References Cited

U.S. PATENT DOCUMENTS

| | | | |
|---|---|---|---|
| 2018/0262924 A1* | 9/2018 | Dao | H04W 72/1257 |
| 2018/0331944 A1* | 11/2018 | Salkintzis | H04L 45/38 |
| 2019/0059067 A1 | 2/2019 | Lee et al. | |
| 2019/0069194 A1 | 2/2019 | Jun et al. | |
| 2019/0306068 A1* | 10/2019 | Kiss | H04L 45/24 |
| 2019/0394833 A1* | 12/2019 | Talebi Fard | H04W 60/00 |
| 2020/0037165 A1* | 1/2020 | Kunz | H04W 12/37 |
| 2020/0145876 A1* | 5/2020 | Dao | H04W 28/06 |
| 2020/0221527 A1* | 7/2020 | Bharatia | H04W 60/00 |
| 2020/0336940 A1* | 10/2020 | Salkintzis | H04W 76/16 |
| 2020/0404739 A1* | 12/2020 | Thiebaut | H04L 12/185 |

OTHER PUBLICATIONS

"3rd Generation Partnership Project; Technical Specification Group Services and System Aspects; Study on access traffic steering, switch and splitting support in the 5G system architecture (Release 16)", 3GPP TR 23.793 V16.0.0 (Dec. 2018).

"3rd Generation Partnership Project; Technical Specification Group Services and System Aspects; Procedures for the 5G System (5GS); Stage 2 (Release 16)",3GPP TS 23.502 V16.2.0 (Sep. 2019).

ETRI, "Updating 5.8.2.11 for N4 Rules to support for ATSSS", 3GPP TSG-SA WG2 Meeting #130, S2-1900849, Kochi, India, Jan. 21-25, 2019.

ETRI, "Updating 5.8.2.11 for N4 Rules to support ATSSS", 3GPP TSG-SA WG2 Meeting #131, S2-1902328, Feb. 25-Mar. 1, 2019, Santa Cruz—Tenerife, Spain.

* cited by examiner

| Attribute | | Description | Comment |
|---|---|---|---|
| N4 Session ID | | Identifies the N4 session associated to this MAR | |
| MAR ID | | Unique identifier to identify this rule | |
| Steering mode | | Values "Active-Standby", "Smallest Delay", "Load Balancing" or "Priority-based" | |
| Per-Access Forwarding Action information (NOTE 1) | Forwarding Action Rule ID | The Forwarding Action Rule ID identifies a forwarding action that has to be applied | |
| | Weight | Identifies the weight for the FAR in case steering mode is "Load Balancing" | The weights for all FARs need to sum up to 100 |
| | Priority | Values "Active or Standby" or "High or Low" for the FAR | "Active or Standby" for "Active-Standby" steering mode "High or Low" for "Priority-based" steering mode |
| | List of Usage Reporting Rule ID(s) | Every Usage Reporting Rule Rule ID identifies a measurement action that has to be applied | This enables the SMF to request separate usage reports for different FARs (i.e. different accesses) |
| NOTE 1 : The Per-Access Forwarding Action information is provided per access type (i.e. 3GPP access or Non-3GPP access) | | | |

FIG. 4

| Attribute | | Description | Comment |
|---|---|---|---|
| N4 Session ID | | Identifies the N4 session associated to this MAR | |
| MAR ID | | Unique identifier to identify this rule | |
| Steering functionality | | Values "MPTCP" or "LL-ATSSS " | Additional method can be included as a value |
| Steering mode | | Values "Active-Standby", "Smallest Delay", "Load Balancing" or "Priority-based" | |
| Per-Access Forwarding Action information (NOTE 1) | Forwarding Action Rule ID | The Forwarding Action Rule ID identifies a forwarding action that has to be applied | |
| | Weight | Identifies the weight for the FAR in case steering mode is "Load Balancing" | The weights for all FARs need to sum up to 100 |
| | Priority | Values "Active or Standby" or "High or Low" for the FAR | "Active or Standby" for "Active-Standby" steering mode "High or Low" for "Priority-based" steering mode |
| | List of Usage Reporting Rule ID(s) | Every Usage Reporting Rule Rule ID identifies a measurement action that has to be applied | This enables the SMF to request separate usage reports for different FARs (i.e. different accesses) |
| NOTE 1 : The Per-Access Forwarding Action information is provided per access type (i.e. 3GPP access or Non-3GPP access) | | | |

FIG. 5

STEERING RULE PROVISION METHOD FOR TRAFFIC DISTRIBUTION IN NETWORK AND NETWORK ENTITY PERFORMING THE SAME

CROSS-REFERENCE TO RELATED APPLICATIONS

This application claims priority to and the benefit of Korean Patent Application Nos. 10-2019-0005385, 10-2019-0018367, and 10-2019-0179568 filed in the Korean Intellectual Property Office on Jan. 15, 2019, Feb. 18, 2019, and Dec. 31, 2019, respectively, the entire contents of which are incorporated herein by reference.

BACKGROUND OF THE INVENTION

1. Field of the Invention

The present invention relates to a steering rule provision method for traffic distribution in a network and a network entity performing the same.

2. Description of Related Art

Recently, standardization of 5G network technology has been underway. In this 5G network, the standardization work is underway to support access traffic steering, switching, and splitting (ATSSS) between a 3GPP access network and a Non-3GPP access network.

Traffic steering is a procedure that selects an access network for a new data flow and transfers the traffic of this data flow over the selected access network. Traffic switching is a procedure that moves all traffic of an ongoing data flow from one access network to another access network in a way that maintains continuity of the data flow. Traffic splitting is a procedure that splits the traffic of a data flow across multiple access networks. These three functions may be referred to as a steering function.

In order to provide traffic (data, voice, etc.) to user equipment (UE) in a 5G network, packet data unit (PDU) session establishment is required between the UE and a data network. After the service is provided, the PDU session needs to be released.

Existing PDU session establishment is performed only through the UE and one access network (3GPP access network or Non-3GPP access network), thereby establishing a single access PDU (SA PDU) session. A plurality of SA PDU sessions may be established in one UE, and the plurality of SA PDU sessions may be distinguished by PDU session identifiers, respectively. If service provision to the UE is terminated or a user traffic session needs to be changed, the established PDU session may be modified or released by triggering of the UE or the network.

However, since an existing single access PDU (SA PDU) session is established for only one access network, user traffic belonging to the corresponding PDU session may not be transmitted/received through two or more access networks. Accordingly, it is difficult to provide a service supporting the ATSSS function. To support the ATSSS function, one PDU session with a unique identifier established over two or more accesses is required. This PDU session is called a multi-access PDU (MA PDU) session.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a steering rule provision method for efficiently distributing traffic to a multi-access network in an MA PDU session and a network entity performing the same.

According to an exemplary embodiment of the present invention, a method of distributing and transmitting traffic in a network may be provided. The method may include transmitting, by a session management function (SMF), a first message including a multi access rule (MAR) to a user plane function (UPF), when establishing or modifying a packet data unit (PDU) session for ATSSS (access traffic steering, switching, and splitting), and receiving, by the SMF, a second message that is a response message to the first message from the UPF.

The first message may be an N4 session modification request, and the second message may be an N4 session modification response message.

The method may further include transmitting, by the SMF, a MAR identifier (ID) to the UPF.

The first message may include the MAR ID.

The MAR ID may be transmitted by being included in an N4 packet detection rule.

The PDU session may be a multi access PDU session.

The MAR may include a steering mode and access forwarding action information.

The steering mode may indicate a traffic steering method between access networks.

The access forwarding action information may exist for each access network.

The steering mode may include one of an active-standby mode, a smallest delay mode, a load balancing mode, and a priority-based mode.

The access forwarding action information may include a forwarding action rule (FAR) identifier (ID), a weight indicating a weight of each access network when the steering mode is the load balancing mode, a priority indicating a priority of each access network when the steering mode is the active-standby mode or the priority based mode, and a plurality of usage reporting rule (URR) identifiers (IDs).

The MAR further may include an N4 session identifier (ID) and an MAR identifier (ID).

The MAR further may include a steering functionality indicating that steering is applied above a first layer or below the first layer.

The steering functionality above the first layer may be a multipath transmission control protocol (MPTCP), and the steering functionality below the first layer may be a lower layer-ATSSS (LL-ATSSS).

According to another exemplary embodiment of the present invention, a method of distributing and transmitting traffic in a network may be provided. The method may include transmitting, by a session management function (SMF), a session modification request message including a multi access rule (MAR) identifier (ID) to a user plane function (UPF), when establishing or modifying a packet data unit (PDU) session for ATSSS (access traffic steering, switching, and splitting), and receiving, by the SMF, a session modification response message that is a response message to the session modification request message from the UPF.

The MAR ID may be transmitted by being included in an N4 packet detection rule, and the session modification request message may further include a multi access rule (MAR).

Configuration information of the MAR may include an N4 session identifier (ID), an MAR identifier, steering functionality indicating that steering is applied above a first layer or below the first layer, a steering mode indicating a traffic steering method between access networks, and an access forwarding action information existing for each access network.

According to another exemplary embodiment of the present invention, a network entity that controls a traffic distribution in a network may be provided. The network entity may include a processor configured to control establishing or modifying a packet data unit (PDU) session for ATSSS (Access Traffic Steering, Switching, and Splitting), and a network interface configured to transmit a session modification request message including a multi access rule (MAR) to another network entity.

The session modification request message may further include an MAR ID, and configuration information of the MAR includes an N4 session identifier (ID), an MAR identifier, a steering functionality indicating that steering is applied above a first layer or below the first layer, a steering mode indicating a traffic steering method between access networks, and access forwarding action information existing for each access network.

The network entity may be a session management function (SMF), and the other network entity may be a user plane function (UPF).

According to an exemplary embodiment of the present invention, traffic can be efficiently transmitted through a multi-access network within a MA PDU session.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Throughout the present specification, user equipment (UE) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), or the like, and may include all or some of the functions of the terminal, the MT, the AMS, the HR-MS, the SS, the PSS, the AT, or the like.

In addition, a base station (BS) may indicate an advanced base station (ABS), a high reliability base station (HR-BS), a nodeB, an evolved nodeB (eNodeB), a base transceiver station (BTS), a mobile multihop relay (MMR)-BS, a relay station (RS) serving as a base station, a high reliability relay station (HR-RS) serving as a base station, and the like, and may include all or some of the functions of the BS, the ABS, the nodeB, the eNodeB, the BTS, the MMR-BS, the RS, the HR-RS, and the like.

Figure 1:
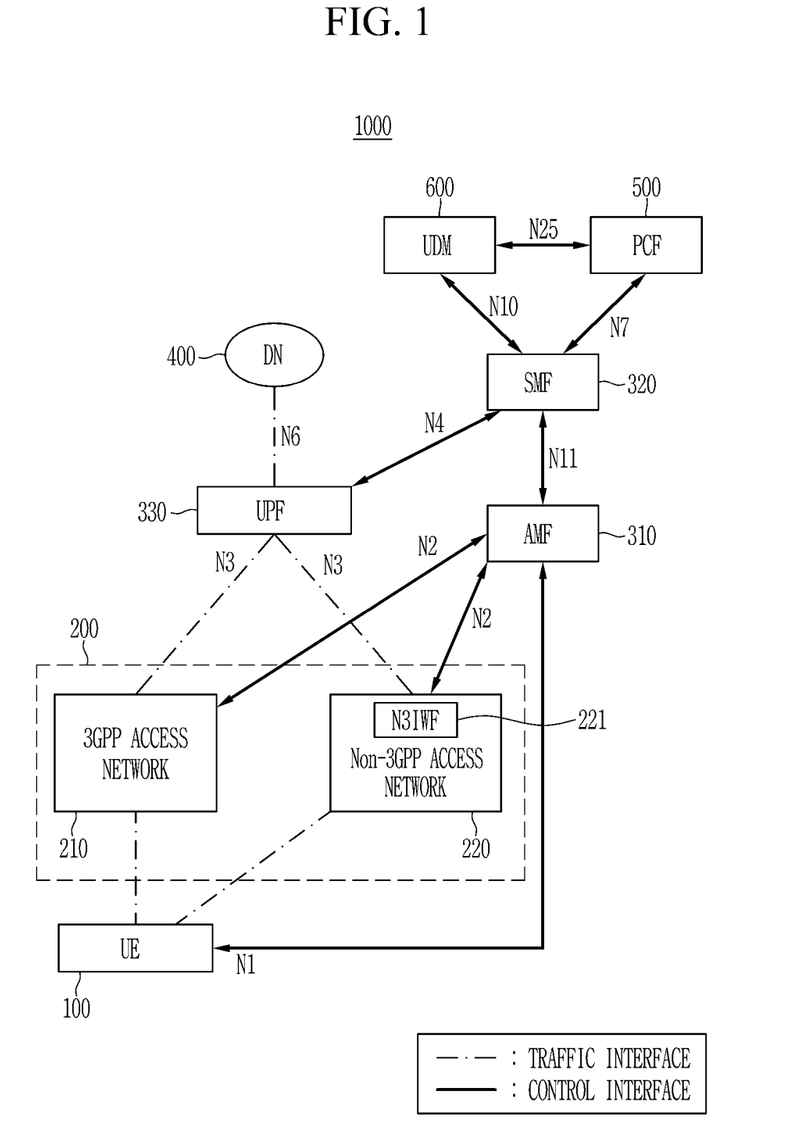
FIG. 1 is a diagram showing a 5G network according to an exemplary embodiment of the present invention.

FIG. 1 is a diagram showing a 5G network according to an exemplary embodiment of the present invention.

As shown in FIG. 1, a 5G network 1000 according to an exemplary embodiment of the present invention includes user equipment (UE) 100, an access network (AN) 200, an access and mobility management function (AMF) 310, a session management function (SMF) 320, a user plane function (UPF) 330, a data network (DN) 400, a policy control function (PCF) 500, and a unified data management (UDM) 600.

The UE 100 may access a network through the AN 200. The AN 200 includes a 3GPP access network 210 and a Non-3GPP access network 220. The UE 100 may access a mobile radio access network via the 3GPP access network 210. The UE 100 may access a wireless LAN access network via the Non-3GPP access network 220. The Non-3GPP access network 220 includes a Non-3GPP interworking function (N3IWF) 221 for N3 and N2 interfaces with the UPF 330 and the AMF 310 by a 5G core network common interface principle.

The AMF 310 and the SMF 320 are network entities that process control signals. The AMF 310 and the SMF 320 have a non-access stratum (NAS) signal interface N1 in correspondence with the UE 100. The AMF 310 performs authentication, access, and mobility control functions through the N1 interface.

The SMF 320 has a session control function (establishment/modification/release for a session) through the N1 interface with the UE 100 and an N4 interface with the UPF 330, and performs a signaling procedure for traffic path establishment and traffic mobility management.

The UPF 330 is a network entity of a data plane that accommodates the multiple access networks 210 and 220 via a common N3 interface. The UPF 330 connects a data plane between the multiple access networks 210 and 220 and the DN 400 so that traffic of the UE 100 (i.e., the user) can be transmitted and received.

The UPF 330 and the access network 200 receive control rules for traffic between the UE 100 and the UPF 330 via N4 and N2 interfaces from the SMF 320, respectively, and perform functions such as traffic detection, routing, and QoS control using the received control rules. Here, in order to support the ATSSS function, a control rule transmitted from the SMF 320 to the UE 100 may be used as an 'ATSSS rule' term, and a control rule transmitted from the SMF 320 to the UPF 330 may be used as an 'N4 forwarding rule' term.

The PCF 500 is connected to the SMF 320 through an N7 signal interface, and controls policies related to session, mobility, and QoS. The PCF 500 may transmit policy and charging control rules (PCCs) required for the SMF 320 to generate the control rule to the SMF 320.

The UDM 600 is connected to the SMF 320 through an N10 signal interface, and manages user information management and policy for each UE such as subscription information of the UE 100. The UDM 600 may transmit information about the profile and subscription of the UE 100 for the ATSSS function to the SMF 320.

As described above, the 5G network system according to an exemplary embodiment of the present invention is an integrated structure that simultaneously accommodates the 3GPP access network 210 and the Non-3GPP access network 220. In this integrated structure, when an MA PDU session is established to provide an ATSSS function (steering function) between the 3GPP access network 210 and the non-3GPP access network 220, traffic may be distributed to the multi-access network within the MA PDU session. Here, in order to control a user plane of an MA-PDU session, a steering rule needs to be added to an existing N4 interface between the SMF 320 and the UPF 330. That is, in the 5G network system as shown in FIG. 1, for the ATSSS function, there is a need for a method of providing a steering rule through the N4 interface to efficiently distribute traffic to the multi-access network within the MA-PDU session. Hereinafter, a method of providing such a steering rule will be described.

Figure 2:
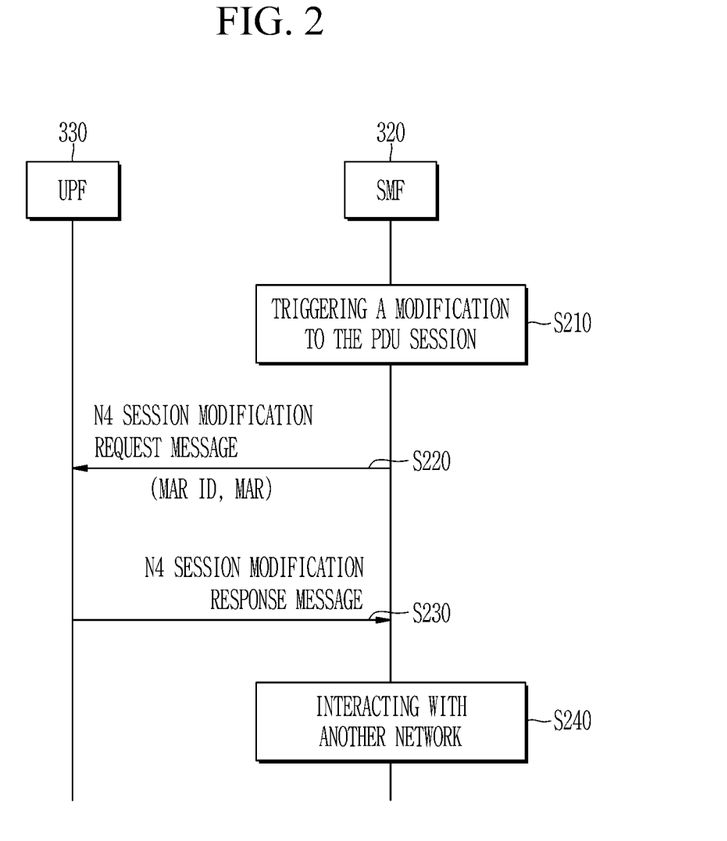
FIG. 2 is a flowchart illustrating an N4 session modification procedure according to an exemplary embodiment of the present invention.

FIG. 2 is a flowchart illustrating an N4 session modification procedure according to an exemplary embodiment of the present invention.

The N4 session modification procedure of FIG. 2 is an N4 signaling procedure performed between the SMF and the UPF 330 in one detailed step of a PDU session establishment procedure, an MA PDU session establishment procedure, a PDU session modification procedure, and an MA PDU modification procedure performed between the UE 100 and the core network. This N4 signaling procedure is used to update an N4 context of an already created PDU session.

First, the SMF 320 may trigger a modification to the PDU session (S210). The triggering on PDU session modification may be triggered by the SMF 320 as well as other network entities.

When the SMF 320 triggers the PDU session modification in step S210, the SMF 320 transmits an N4 session modification request message to the UPF 330 (S220). That is, the SMF 320 transmits the N4 session modification request message to the UPF 330 when updating the N4 context.

The N4 session modification request message includes a multi access rule identifier (MAR ID) and a multi access rule (MAR).

The MAR ID may be included in an existing N4 packet detection rule (N4 PDR) and transmitted. To support the ATSSS function, the N4 PDR is used for user plane control within the MA PDU session. The MAR ID according to an exemplary embodiment of the invention can be added in such N4 PDR. Meanwhile, in order to control the UPF 330, the SMF 320 may transmit a QoS enforcement rule (QER) and a usage reporting rule (URR) in addition to the PDR through the N4 interface to the UPF 330. The N4 PDR may further include an N4 session ID, a list of URR IDs, a list of QER IDs, and the like as well as the MAR ID. Meanwhile, in the case of a single access PDU session, the N4 PDR may include a forwarding action rule identifier (FAR ID) instead of the MAR ID. That is, in the case of a MA PDU session, the N4 PDR may include the MAR ID, and in the case of an SA PDU session, the N4 PDR may include a FAR ID.

Detailed configuration information of the MAR will be described in more detail with reference to FIGS. 3 and 4 below.

The UPF 330 applies traffic steering and forwarding for each specific packet flow and flow group using the MAR included in the N4 session modification request message. The UPF 330 transmits an N4 session modification response message (S230).

When the SMF 320 receives the N4 session modification response message in step S230, the SMF 320 interacts with another network for PDU session establishment or PDU session modification (S240). That is, in addition to the detailed steps shown in FIG. 2, the other detailed steps of the MA PDU session establishment procedure in Section 4.22.2~3 and the other detailed steps of the MA PDU modification procedure in Section 4.22.8 of 3GPP TS23.502 v16.20 (2019-09) can be performed.

Figure 3:
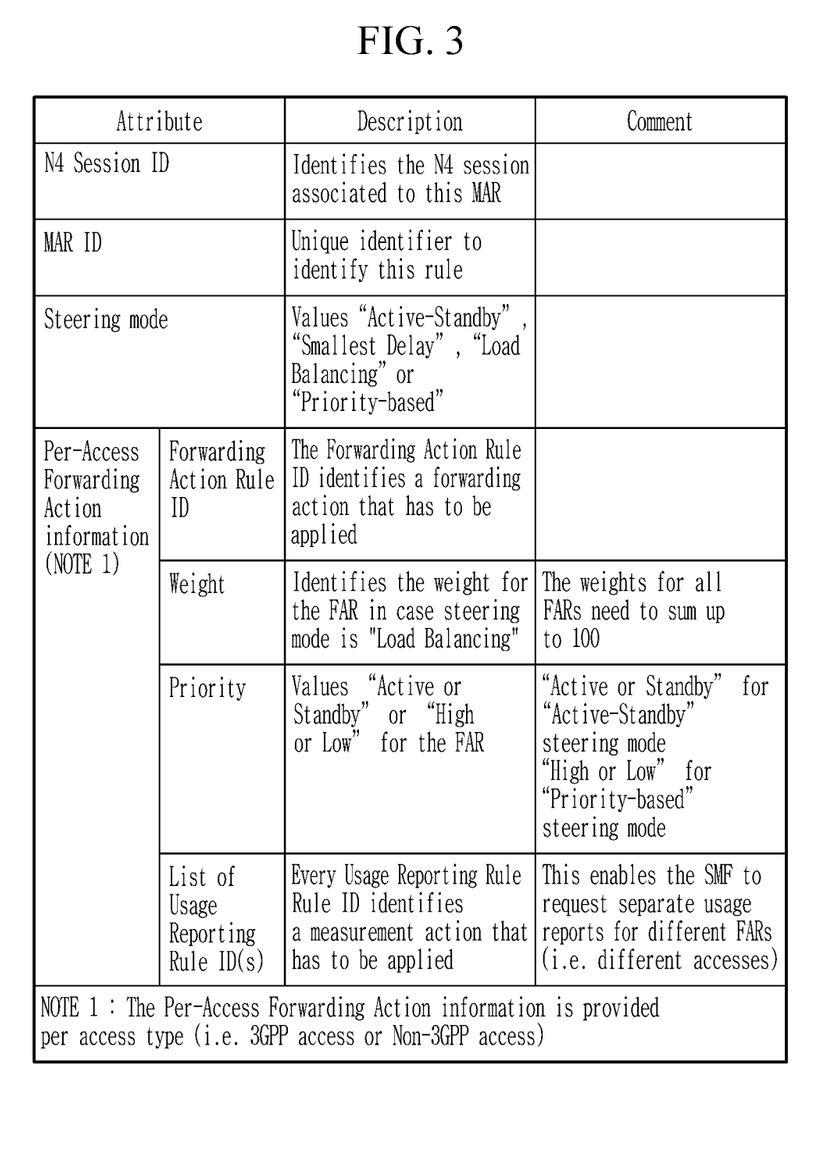
FIG. 3 is a diagram illustrating configuration information of a multi access rule (MAR) according to an exemplary embodiment of the present invention.

FIG. 3 is a diagram illustrating configuration information of the multi access rule (MAR) according to an exemplary embodiment of the present invention.

As shown in FIG. 3, the configuration information of the MAR according to an exemplary embodiment of the present invention includes an N4 session ID, an MAR ID, a steering mode, and access forwarding action information.

The N4 session ID is an identifier shared by the SMF 320 and the UPF 330 to manage the N4 session. PDU sessions created in the UE 100 are distinguished by PDU session IDs assigned by the UE 100. This PDU session ID is used by the SMF 320 and is an identifier for identifying a PDU session. The SMF 320 manages an N4 session used for traffic control through the PDU session ID and the N4 interface. The PDU session ID and the N4 session ID have a 1:1 relationship with each other.

The MAR ID is an identifier that uniquely manages the MAR.

The MAR ID is assigned to each MAR. Also, as described above with reference to FIG. 2, the MAR ID may be separately included and transmitted in the N4 packet detection rule (N4 PDR) at the N4 session modification procedure of the MA PDU session establishment or modification procedure.

Steering mode indicates by what rule the ATSSS operation between access networks is performed. The steering mode includes one of an active-standby mode, a smallest delay mode, a load balancing mode, and a priority-based mode.

The active-standby mode indicates operating in active-standby between two accesses (e.g., 3GPP access network 210 and Non-3GPP access network 220).

For example, the 3GPP access network 210 may operate in an active state and the Non-3GPP access network 220 may operate in a standby state.

The smallest delay mode indicates that the round trip time (RTT) operates with the shortest access network. For example, if the RTT of the 3GPP access network 210 is short among the two access networks 210 and 220, the 3GPP access network 210 may be selected. Here, the method for calculating the RTT will be understood by those skilled in the art to which the present invention pertains, and thus a detailed description thereof will be omitted.

The load balancing mode indicates that each access network transmits at a predetermined rate. For example, traffic may be distributed in a 7:3 weight between the 3GPP access network 210 and the Non-3GPP access network 220.

The priority-based mode indicates that the access networks operate according to priorities.

For example, when the 3GPP access network 210 has a high priority among the two access networks 210 and 220, data may be preferentially transmitted first through the 3GPP access network 210.

The access forwarding action information exists for each access network. For example, when two access networks 210 and 220 exist, the access forwarding action information exists in the two access networks 210 and 220, respectively.

As shown in FIG. 3, the access forwarding action information may include a forwarding action rule identifier (FAR ID), weight information, priority information, and a plurality of usage reporting rule (URR) IDs.

The weight information indicates a weight applied to each access network when the steering mode is the load balancing mode.

The priority information indicates a priority value for each access network when the steering mode is the active-standby mode or the priority-based mode. When the steering mode is the active-standby mode, the priority information may be set to active or standby. When the steering mode is the priority-based mode, the priority information may be set to high or low.

The plurality of URR IDs indicate a list of URR IDs. Through this list of URR IDs, the SMF 320 may request a separate usage report for another forwarding action rule (FAR).

By using the MAR configuration information of FIG. 3 described above, traffic distribution through a multi-access network can be effectively performed within a MA PDU session.

Figure 4:
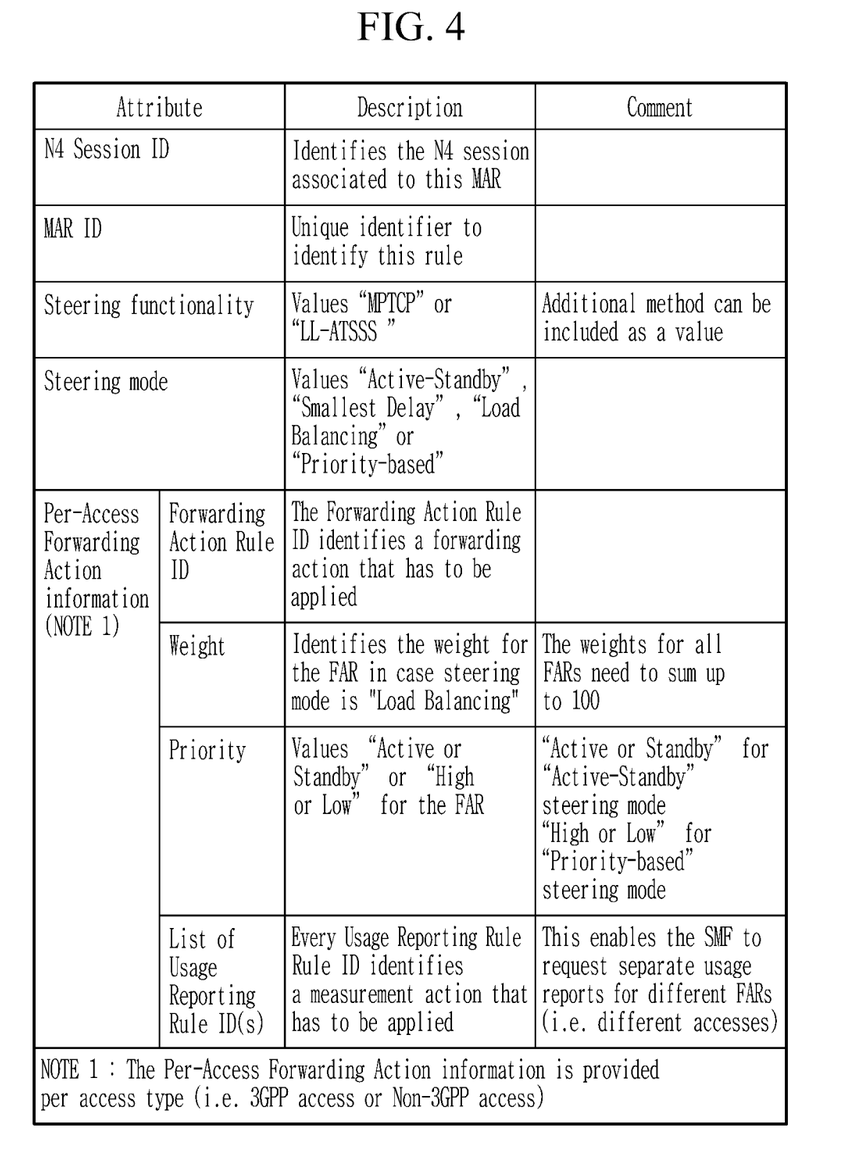
FIG. 4 is a diagram illustrating configuration information of a multi access rule (MAR) according to another exemplary embodiment of the present invention.

FIG. 4 is a diagram illustrating configuration information of the multi access rule (MAR) according to another exemplary embodiment of the present invention.

As shown in FIG. 4, the configuration information of the MAR according to the other exemplary embodiment of the present invention includes an N4 session ID, a steering functionality, an MAR ID, a steering mode, and access forwarding action information.

That is, the MAR configuration information according to the other exemplary embodiment of the present invention is the same as the MAR configuration information of FIG. 3 except that a steering functionality is added.

The steering functionality includes a multi-path transmission control protocol (MPTCP) or a lower layer-ATSSS (LL-ATSSS). That is, the steering functionality may be set to one of 'MPTCP' and 'LL-ATSSS'. MPTCP means that the steering (i.e., ATSSS) is applied above a PDU session layer, and LL-ATSSS means that the steering (i.e., ATSSS) is applied below the PDU session layer. The SMF 320 includes the steering functionality in the MAR configuration information and transmits to the UPF 330, and the UPF 330 applies according to the received steering functionality (MPTCP or LL-ATSSS) for a specific packet flow and packet flow group.

Through the MAR configuration information as shown in FIG. 4, the UPF 330 may apply the steering functionality to a specific packet flow and packet flow group to efficiently provide traffic distributed transmission through a multi-access network.

Figure 5:
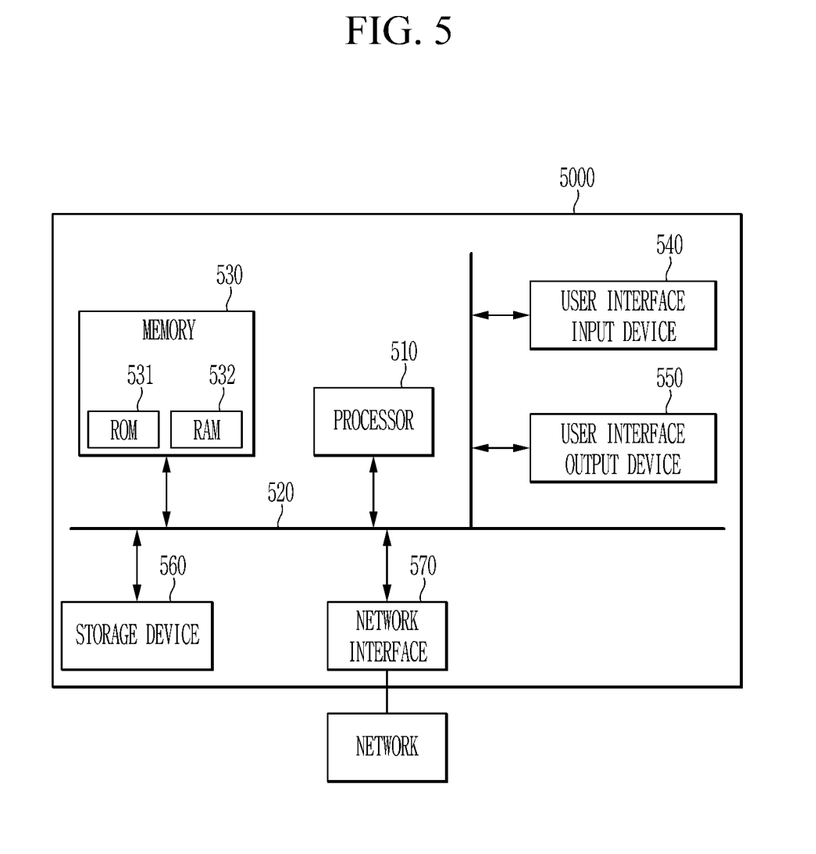
FIG. 5 is a diagram showing a computing system according to an exemplary embodiment of the present invention.

FIG. 5 is a diagram showing a computing system according to an exemplary embodiment of the present invention.

The computer system 5000 of FIG. 5 may be the AMF 310, the SMF 320, the UPF 330, the DN 400, the PCF 500, or the UDM 600 of FIG. 1. The UE 100, the access network 200, the AMF 310, the SMF 320, the UPF 330, the DN 400, the PCF 500, or the UDM 600 may be implemented as a computer system, for example, a computer readable medium.

The computer system 5000 includes at least one of a processor 510, a memory 530, a user interface input device 540, a user interface output device 550, and a storage device 560, that communicate via a bus 520. The computer system 5000 may also include a network interface 570 coupled to a network. The network interface 570 may transmit or receive signals with other entities over the network.

The processor 510 may be a central processing (CPU) or a semiconductor device that executes instructions stored in the memory 530 or the storage device 560. The processor 510 may be configured to implement the functions and methods described in FIG. 1 to FIG. 4.

The memory 530 and the storage device 560 may include various forms of volatile or non-volatile storage media. For example, the memory 530 may include a read only memory (ROM) 531 and a random access memory (RAM) 532. In an exemplary embodiment of the present invention, the memory 530 may be located inside or outside the processor 510, and the memory 530 may be coupled to the processor 510 through various already-known means.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as an optical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method of distributing and transmitting traffic in a network, the method comprising:
   transmitting, by a session management function (SMF), a first message including a multi access rule (MAR) to a user plane function (UPF), when establishing or modifying a packet data unit (PDU) session for ATSSS (access traffic steering, switching, and splitting); and
   receiving, by the SMF, a second message that is a response message to the first message from the UPF, wherein the MAR includes a steering mode and access forwarding action information.

2. The method of claim 1, wherein the first message is an N4 session modification request, and the second message is an N4 session modification response message.

3. The method of claim 1, wherein the PDU session is a multi access PDU session.

4. The method of claim 1, wherein the steering mode indicates a traffic steering method between access networks.

5. The method of claim 4, wherein the steering mode includes one of an active-standby mode, a smallest delay mode, a load balancing mode, and a priority-based mode.

6. The method of claim 5, wherein the access forwarding action information includes:
   a forwarding action rule identifier;
   a weight indicating a weight of each access network when the steering mode is the load balancing mode;
   a priority indicating a priority of each access network when the steering mode is the active-standby mode or the priority based mode; and
   a plurality of usage reporting rule (URR) identifiers (IDs).

7. The method of claim 1, wherein the access forwarding action information exists for each access network.

8. The method of claim 1, wherein the MAR further includes an N4 session identifier (ID) and an MAR identifier (ID).

9. The method of claim 1, wherein the MAR further includes a steering functionality indicating that steering is applied above a first layer or below the first layer.

10. A method of distributing and transmitting traffic in a network, the method comprising:
    transmitting, by a session management function (SMF), a session modification request message including a multi access rule (MAR) to a user plane function (UPF), when establishing or modifying a packet data unit (PDU) session for ATSSS (access traffic steering, switching, and splitting); and
    receiving, by the SMF, a session modification response message that is a response message to the session modification request message from the UPF, wherein the MAR includes steering functionality indicating that steering is applied above a first layer or below the first layer.

11. The method of claim 10, wherein the steering functionality above the first layer is a multipath transmission control protocol (MPTCP), and the steering functionality below the first layer is a lower layer-ATSSS (LL-ATSSS).

12. The method of claim 11, wherein the MAR further includes an N4 session identifier (ID), an MAR identifier, a steering mode indicating a traffic steering method between access networks, and an access forwarding action information existing for each access network.

13. A network entity that controls a traffic distribution in a network, the network entity comprising:
    a processor configured to control establishing or modifying a packet data unit (PDU) session for ATSSS (Access Traffic Steering, Switching, and Splitting); and
    a network interface configured to transmit a session modification request message including a multi access rule (MAR) to another network entity, wherein the MAR includes a steering mode indicating a traffic steering method between access networks, and access forwarding action information existing for each access network.

14. The network entity of claim 13, wherein the MAR further includes an N4 session identifier (ID), an MAR identifier, a steering functionality indicating that steering is applied above a first layer or below the first layer.

15. The network entity of claim 13, wherein the network entity is a session management function (SMF), and the other network entity is a user plane function (UPF).

* * * * *